(12) United States Patent
Ahmed et al.

(10) Patent No.: US 8,988,026 B2
(45) Date of Patent: Mar. 24, 2015

(54) SINGLE PHASE OPERATION OF A THREE-PHASE DRIVE SYSTEM

(75) Inventors: Ahmed Mohamed Sayed Ahmed, Mequon, WI (US); Lixiang Wei, Whitefish Bay, WI (US); Brian J. Seibel, Grafton, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 224 days.

(21) Appl. No.: 13/563,488

(22) Filed: Jul. 31, 2012

(65) Prior Publication Data

US 2014/0035492 A1 Feb. 6, 2014

(51) Int. Cl.
| | | |
|---|---|---|
| H02P 27/00 | (2006.01) | |
| H02M 5/458 | (2006.01) | |
| H02M 1/10 | (2006.01) | |
| H02M 1/32 | (2007.01) | |
| H02M 7/219 | (2006.01) | |
| H02P 27/06 | (2006.01) | |

(52) U.S. Cl.
CPC ............ *H02M 5/4585* (2013.01); *H02M 1/10* (2013.01); *H02M 2001/325* (2013.01); *H02M 2007/2195* (2013.01); *H02P 27/06* (2013.01); *Y02B 70/1408* (2013.01)
USPC .................. 318/400.3; 318/400.13; 318/803; 318/807

(58) Field of Classification Search
USPC ............ 318/400.13, 400.3, 803, 807; 363/35, 363/36, 37
See application file for complete search history.

(56) References Cited

U.S. PATENT DOCUMENTS

| | | | | |
|---|---|---|---|---|
| 4,521,840 | A * | 6/1985 | Hoadley | 363/35 |
| 4,567,420 | A * | 1/1986 | Beck | 318/803 |
| 5,886,619 | A * | 3/1999 | Takasan et al. | 370/276 |
| 6,297,980 | B1 * | 10/2001 | Smedley et al. | 363/89 |
| 6,545,887 | B2 * | 4/2003 | Smedley et al. | 363/89 |
| 6,548,985 | B1 * | 4/2003 | Hayes et al. | 320/108 |
| 6,614,217 | B2 * | 9/2003 | Oohashi | 324/107 |
| 6,762,947 | B2 * | 7/2004 | Hammond | 363/35 |
| 6,801,441 | B2 * | 10/2004 | Salama | 363/37 |
| 7,259,477 | B2 * | 8/2007 | Klikic et al. | 307/65 |
| 7,292,004 | B2 * | 11/2007 | Ueda et al. | 318/805 |
| 7,330,011 | B2 * | 2/2008 | Ueda et al. | 318/807 |
| 7,521,823 | B2 * | 4/2009 | Klikic et al. | 307/66 |
| 7,599,196 | B2 * | 10/2009 | Alexander | 363/13 |
| 7,843,676 | B2 * | 11/2010 | Klikic et al. | 361/93.1 |
| 7,986,062 | B2 * | 7/2011 | Jakeman et al. | 307/151 |
| 8,107,267 | B2 * | 1/2012 | Tallam et al. | 363/37 |

(Continued)

OTHER PUBLICATIONS

Sayed-Ahmed, Ahmed et al., Industrial Regenerative Motor-Drive Systems, Feb. 5-9, 2012, pp. 1555-1561, Applied Power Electronics Conference and Exposition (APEC), 2012 Twenty-Seventh Annual IEEE.

*Primary Examiner* — Paul Ip
(74) *Attorney, Agent, or Firm* — Fletcher Yoder, P.C.

(57) ABSTRACT

Single-phase voltage operation techniques are provided for a three-phase drive system. A drive system may include a rectifier configured to couple to a three-phase AC voltage source. The rectifier may be configured to convert AC voltage from the three-phase AC voltage source to a direct current (DC) voltage. The drive system may also include a controller configured to send a plurality of switching signals to a plurality of switches in the rectifier such that the plurality of switching signals minimizes a current provided to the rectifier when only a single-phase of the three-phase AC voltage source is available.

24 Claims, 5 Drawing Sheets

(56) References Cited

U.S. PATENT DOCUMENTS

| | | | |
|---|---|---|---|
| 8,134,811 B2* | 3/2012 | Klikic et al. | 361/8 |
| 8,183,813 B2* | 5/2012 | Jahkonen et al. | 318/503 |
| 8,188,693 B2 | 5/2012 | Wei et al. | |
| 8,264,191 B1* | 9/2012 | Ranganathan et al. | 318/767 |
| 8,300,426 B2* | 10/2012 | Alexander | 363/17 |
| 8,503,207 B2* | 8/2013 | Tallam et al. | 363/98 |
| 8,590,672 B2* | 11/2013 | Oggianu et al. | 187/290 |
| 8,629,637 B2* | 1/2014 | Blasko et al. | 318/376 |
| 8,796,969 B2* | 8/2014 | Goetz | 318/400.26 |
| 2002/0027432 A1* | 3/2002 | Oohashi | 324/86 |
| 2002/0149953 A1* | 10/2002 | Smedley et al. | 363/84 |
| 2003/0112643 A1* | 6/2003 | Salama | 363/37 |
| 2003/0223251 A1* | 12/2003 | Hammond | 363/35 |
| 2004/0245961 A1* | 12/2004 | Ueda et al. | 318/805 |
| 2005/0007799 A1* | 1/2005 | Schreiber et al. | 363/132 |
| 2005/0012490 A1* | 1/2005 | Ueda et al. | 318/807 |
| 2005/0036248 A1* | 2/2005 | Klikic et al. | 361/42 |
| 2005/0105229 A1* | 5/2005 | Deng et al. | 361/90 |
| 2005/0134248 A1* | 6/2005 | Locker et al. | 323/285 |
| 2006/0214624 A1* | 9/2006 | Jahkonen | 318/807 |
| 2007/0170884 A1* | 7/2007 | Goetz | 318/772 |
| 2008/0013351 A1* | 1/2008 | Alexander | 363/123 |
| 2008/0031019 A1* | 2/2008 | Alexander | 363/37 |
| 2008/0042491 A1* | 2/2008 | Klikic et al. | 307/66 |
| 2008/0130183 A1* | 6/2008 | Kawashima | 361/79 |
| 2009/0059625 A1* | 3/2009 | Viitanen et al. | 363/36 |
| 2009/0218175 A1* | 9/2009 | Wesson et al. | 187/290 |
| 2009/0231892 A1* | 9/2009 | Klikic et al. | 363/56.1 |
| 2010/0006378 A1* | 1/2010 | Blasko | 187/290 |
| 2010/0067272 A1* | 3/2010 | Alexander | 363/123 |
| 2010/0091529 A1* | 4/2010 | Jakeman et al. | 363/36 |
| 2010/0123425 A1* | 5/2010 | Campbell et al. | 318/600 |
| 2010/0172162 A1* | 7/2010 | Tallam et al. | 363/37 |
| 2010/0201197 A1* | 8/2010 | Shires et al. | 307/73 |
| 2010/0301793 A1* | 12/2010 | Jahkonen et al. | 318/503 |
| 2011/0043042 A1* | 2/2011 | Klikic et al. | 307/66 |
| 2011/0101897 A1* | 5/2011 | Wei et al. | 318/400.3 |
| 2011/0147130 A1* | 6/2011 | Oggianu et al. | 187/290 |
| 2011/0247900 A1* | 10/2011 | Blasko et al. | 187/247 |
| 2011/0299308 A1* | 12/2011 | Cheng et al. | 363/37 |
| 2012/0008353 A1* | 1/2012 | Alexander | 363/123 |
| 2012/0014151 A1* | 1/2012 | Alexander | 363/123 |
| 2012/0075892 A1* | 3/2012 | Tallam et al. | 363/37 |
| 2012/0081061 A1* | 4/2012 | Zargari et al. | 318/503 |
| 2012/0212982 A1* | 8/2012 | Wei et al. | 363/37 |
| 2012/0300511 A1* | 11/2012 | Itoh et al. | 363/37 |
| 2012/0313438 A1* | 12/2012 | Klikic et al. | 307/66 |

* cited by examiner

SINGLE PHASE OPERATION OF A THREE-PHASE DRIVE SYSTEM

BACKGROUND

The present disclosure relates generally to the field of electrical drive systems. More particularly, the disclosure relates to techniques for operating fundamental front end (FFE) rectifiers in an electrical motor drive system using a single-phase of alternating current (AC) power.

Power rectifiers, such as FFE rectifiers, are used in a wide range of applications including electrical motor drive systems. The power rectifiers are generally designed to rectify and condition incoming three-phase AC voltage into a direct current (DC) voltage, which may be inverted back to a controllable AC voltage. The controllable AC voltage may then be used to power or drive a motor in the electrical motor drive system. In order to decrease the speed of the motor in the motor drive system, the motor drive system also includes some type of motor braking ability in which energy from the motor braking is dissipated or re-converted. That is, the energy resulting from the braking operation can either be routed to a resistor, which will dissipate the energy as heat, or routed back into a power network that supplies the motor drive system its three-phase AC voltage (i.e., source). By routing the energy created from the braking operation of the motor (i.e., regenerative energy) back to its source, the electrical motor drive system becomes an energy efficient regenerative motor drive system.

One type of rectifier (i.e., converter) widely used for regenerative motor drive systems includes an FFE rectifier. The FFE rectifier is a simple and cost effective regenerative power converter that rectifies and conditions the incoming three-phase AC voltage into a DC voltage. Additionally, the FFE rectifier includes insulated gate bipolar transistor (IGBT) switches to send regenerated energy of the motor back to its source. Generally, a motor drive system is effectively capable of driving its load while the FFE rectifier is coupled to a three-phase AC voltage source. However, it is now recognized that it may be useful to operate the motor drive system using a single-phase AC voltage source.

BRIEF DESCRIPTION

The present disclosure generally relates to systems and techniques for operating a fundamental front end (FFE) rectifier using a single-phase of alternating current (AC) power. Motor drive systems and the like may use a FFE rectifier to convert a three-phase AC voltage into a direct current (DC) voltage on a DC bus. The DC bus may be coupled to an inverter, which may invert the DC voltage and generate a controllable AC voltage. The controllable AC voltage may then be used to drive a motor, which may be coupled to a load.

To reduce cost and various adverse effects associated with certain filters coupled to the FFE rectifier, a low (e.g., approximately 3% per unit impedance) frequency line reactor may be coupled between a source of the three-phase AC voltage and the FFE rectifier. However, due to relatively low inductance values of the line reactor, the magnitudes of input currents supplied to the FFE rectifier, magnitudes of DC voltage ripple output by the FFE rectifier, magnitudes of DC current ripple output by the FFE rectifier, and the like may increase. Keeping the foregoing in mind, if the FFE rectifier receives a single-phase of AC voltage instead of a three-phase AC voltage, the magnitudes of the input currents, DC voltage ripple, and DC current ripple may increase even more. In some cases, the motor drive system may not be able to operate under these increased input currents, DC voltage ripple, and DC current ripple. As such, to keep the motor drive system operating using a single-phase AC voltage, a controller in accordance with present technologies may modify switching patterns of switches (e.g., IGBTs) in the FFE rectifier such that the FFE rectifier may minimize the magnitudes of the input currents, the DC voltage ripple, the DC current ripple, and the like.

In one embodiment, the controller may disable the switches on one leg of the FFE rectifier and turn the switches located on another leg of the FFE rectifier on and off according to an angle of the single-phase AC voltage. In other words, the controller may adaptively control when each switch turns on and off by controlling a conduction period ($\theta_c$) and a firing angle ($\alpha$) of each switch such that the input root-mean-square (RMS) current, the DC voltage ripple, and the DC current ripple are minimized and the motor in the drive system is still operational.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Systems and methods of the present disclosure are related to operating a fundamental front end (FFE) rectifier in a motor drive system using a single-phase of alternating current (AC) voltage. As mentioned above, when the FFE rectifier receives a single-phase input AC voltage instead of a three-phase input AC voltage, increased input currents to the FFE rectifier, voltage ripple output on the direct current (DC) bus by the FFE rectifier, and DC current ripple output by the FFE rectifier may cause the motor in the motor drive system to stop operating. However, by modifying a switching pattern of switches (e.g., IGBTs) in the FFE rectifier, the motor in the motor drive system may continue operating even with a single-phase of input AC voltage. Details regarding the motor drive system and how the switching patterns may be used to control the FFE of the motor drive system using a single-phase input voltage are described below with reference to FIGS. 1-6.

Figure 1:
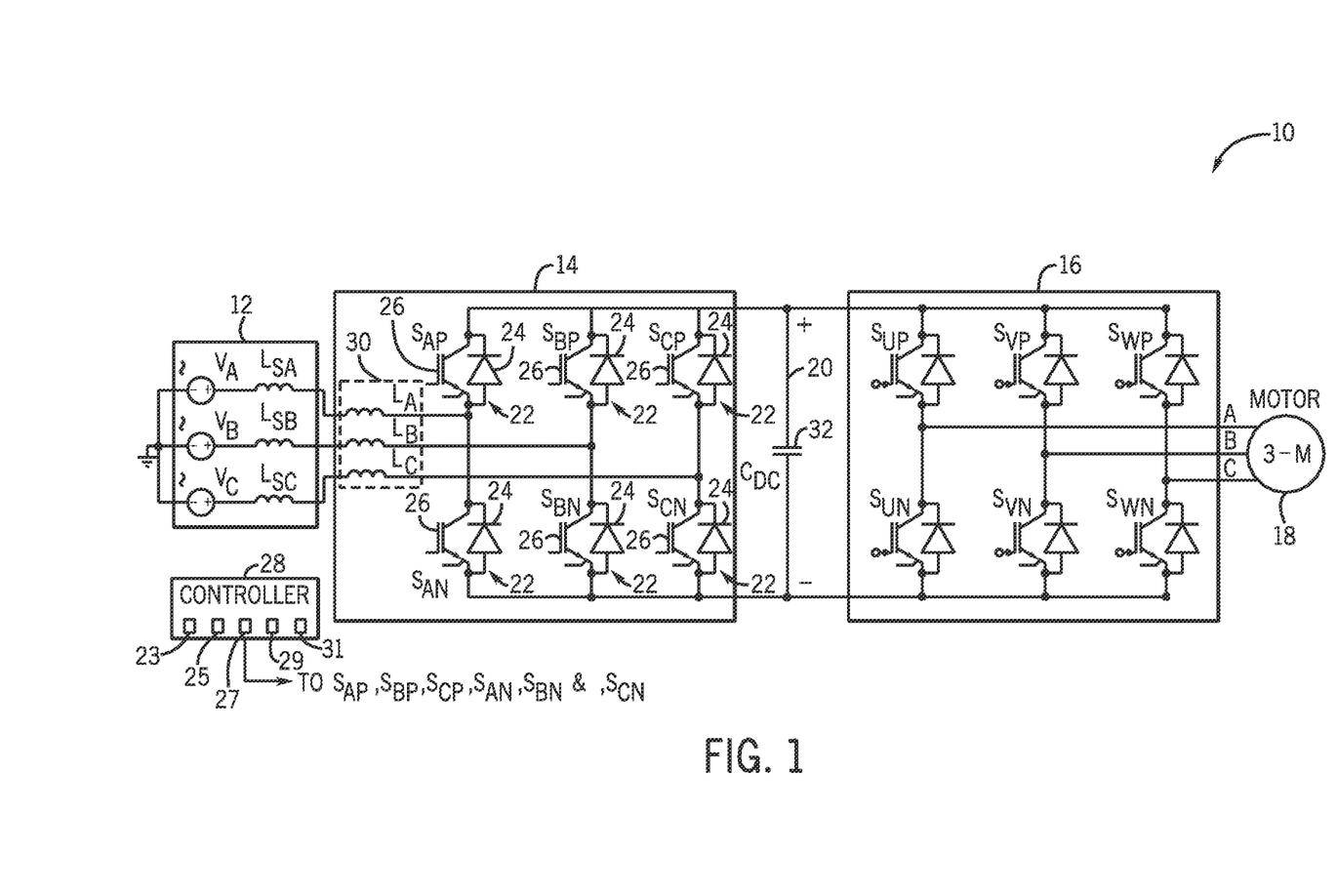
FIG. 1 is a diagrammatical representation of a three-phase motor drive system, in accordance with an embodiment.

Referring now to the figures, FIG. 1 is a diagrammatical representation of a three-phase motor drive system 10. The three-phase motor drive system 10 includes a three-phase source 12, a FFE rectifier 14, an inverter 16, and a motor 18. Generally, the FFE rectifier 14 may receive three phases of AC voltage (e.g., $V_a$, $V_b$, and $V_c$) from the three-phase source 12. The FFE rectifier 14 may then rectify or convert the three-phase AC voltage into a DC voltage across a DC bus 20. As such, the FFE rectifier may be considered to be a six-pulse rectifier. To convert the three-phase AC voltage into the DC voltage, a number of switches 22 in the FFE rectifier 14 may turn on and off such that the output waveform of the FFE rectifier 14 resembles a DC voltage. In certain embodiments, the switches 22 may include power diodes 24 and insulated gate bipolar transistors (IGBTs) 26. Although IGBTs are described herein as switches used in the FFE rectifier 14, it should be noted that in other embodiments other types of switches such as thyrsitors, silicon-controlled rectifiers (SCRs), and the like may be used as switches in the rectifier 14. While the FFE rectifier 14 converts the three-phase AC voltage into the DC voltage, the current from the three-phase voltage source 12 may conduct to the DC bus 20 via the power diodes 24. However, when the motor 18 is slowing down (i.e., braking), the resulting regenerative braking energy may not be returned to the three-phase source 12 via the power diodes 24. Instead, a controller 28 associated with the FFE rectifier 14 may send signals (i.e., switching pattern signals) to the IGBTs 26 such that the regenerative braking energy from the motor 18 may be returned back to the three-phase source 12.

In certain embodiments, the controller 28 may include various components, which may be used to generate the switching pattern signals and to send the switching pattern signals to the IGBTs 26. For instance, the controller 28 may include a communication component 23, a processor 25, a memory 27, storage 29, input/output (I/O) ports 31, and the like. The communication component 23 may be a wireless or wired communication component that may facilitate communication between the controller 28, each IGBT 26, the input source, the DC bus 20, the inverter 16, the motor 18, and the like. The processor 25 may be any type of computer processor or microprocessor capable of executing computer-executable code. The memory 27 and the storage 29 may be any suitable articles of manufacture that can serve as media to store processor-executable code. These articles of manufacture may represent computer-readable media (i.e., any suitable form of memory or storage) that may store the processor-executable code used by the processor to perform the presently disclosed techniques.

Since current may flow through the power diodes 24 when the FFE rectifier 14 converts the three-phase AC voltage into the DC voltage, the FFE rectifier 14 may not be considered to be a fully controllable converter. That is, if the DC voltage across the DC bus 20 is less than the instantaneous value of the input line voltage (i.e., respective input AC phase voltage), the current may flow through the power diodes 24, which do not require any switching signals to operate. However, when the DC voltage across the DC bus 20 is higher than the instantaneous value of the input line voltage, the controller 28 may send switching pattern signals to the IGBTs 26 to enable the FFE rectifier 14 to route the regenerative braking energy (i.e., regenerative current) from the DC bus 20 back to the three-phase source 12 via the IGBTs 26.

In general, the FFE rectifier 14 may include a low line filter impedance in order to be more cost effective, have a reduced size, produce a significantly higher power density, and the like. In certain embodiments, the low line filter impedance may include line reactors 30 such that each line reactor 30 has an inductance (e.g., $L_a$, $L_b$, and $L_c$) of approximately 3% per unit. The line reactors 30 may limit a peak DC current output by the FFE rectifier 14 and limit stress on a DC link capacitor 32 and the switches 22.

Although the three-phase motor drive system 10 depicted in FIG. 1 may be used to return regenerative braking energy of the motor 18 back to the three-phase source 12, in traditional systems, the motor 18 of the three-phase motor drive system 10 may not function unless three phases of AC voltage are available. In other words, if one or two of the line voltages from the three-phase source 12 becomes unavailable due to a severe disturbance on one or two of the lines of the three-phase source 12 or due to a fault on one or two of the lines of the three-phase source 12, the motor 18 may stop operating. Moreover, in some instances, a three-phase voltage source may not be available where the three-phase motor drive system 10 may be placed in service. As such, present embodiments control the operation of the three-phase motor drive system 10 such that the motor 18 may still operate when just one line voltage (i.e., single-phase) is available.

To enable the three-phase motor drive system 10 to operate the motor 18 when coupled to a single-phase AC source (or a three-phase AC source with one operating phase), the controller 28 may modify its operation of the FFE rectifier 14 from a three-phase mode to a single-phase mode. By modifying the operation of the FFE rectifier 14 to the single-phase mode, the controller 28 may modify the switching pattern signals sent to the IGBTs 26. If the controller 28 did not modify these switching pattern signals, the input current from the single-phase AC source, the DC voltage ripple, and the DC current ripple may be significantly higher as compared to when the FFE rectifier 14 is connected to a three-phase AC source. These higher input currents, DC voltage ripple, and DC current ripple may cause protective devices (e.g., breakers) to stop the operation of the motor drive system 10. Further, even if the higher input currents and DC voltage ripple did not cause the protective devices to stop the operation of the motor drive system 10, the higher input currents, DC voltage ripple, and DC current ripple may generate additional stress on the devices within the motor drive system 10 (e.g., switches 22, motor 18), which may decrease the overall life of the motor drive system 10.

Figure 2:
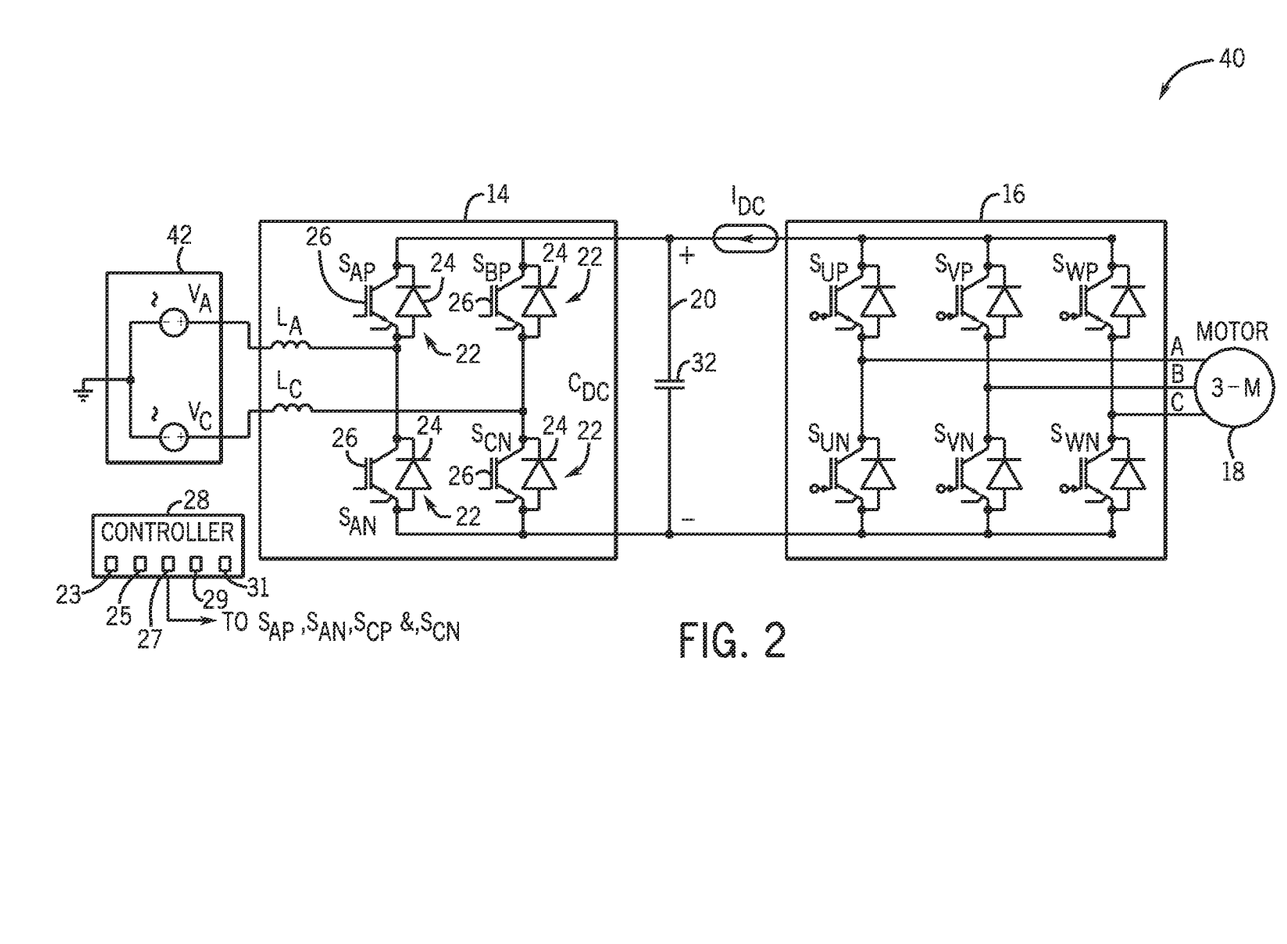
FIG. 2 is a diagrammatical representation of the three-phase motor drive system of FIG. 1 operating as a single-phase motor drive system, in accordance with an embodiment.

In certain embodiments, to operate the three-phase motor drive system 10 using a single-phase AC source, the controller 28 may alter the switching signals such that the IGBTs 26 located on one leg (i.e., coupled to one phase of the three-phase source 12) of the FFE rectifier 14 are continuously turned off For example, FIG. 2 illustrates the three-phase motor drive system 10 operating as a single-phase motor drive system 40. Like the three-phase motor drive system 10, the single-phase motor drive system 40 may include the FFE rectifier 14, the inverter 16, the motor 18, the DC bus 20, and the controller 28. However, unlike the three-phase motor drive system 10, the single-phase motor drive system 40 may include a single-phase voltage source 42, which may provide one line voltage (e.g., $V_{ac}$) to the FFE rectifier 14.

Further, instead of sending switching pattern signals to six IGBTs 26, the controller 28 of the single-phase motor drive system 40 may send switching pattern signals to the IGBTs 26 located on just two of the three legs of the FFE rectifier 14. For example, the controller 28 may send switching pattern signals to the IGBTs 26 located on the first and third legs of the FFE rectifier 14. As such, when the regenerative braking energy (e.g., $I_{dc}$) is being returned to the single-phase source 42, one switch (e.g., $S_{ap}$) on a positive side of a first leg in the FFE rectifier 14 and one switch (e.g., $S_{cn}$) on a negative side of a second leg in the FFE rectifier 14 may be turned "on" such that the regenerative braking energy (e.g., $I_{dc}$) may be conducted through the two switches back to the single-phase source 42. For instance, the controller 28 may simultaneously turn both switch $S_{ap}$ and switch $S_{cn}$ "on" at a positive peak of the input single-phase AC voltage. Similarly, the controller 28 may also simultaneously turn both switch $S_{cp}$ and switch $S_{an}$ "on" at the negative peak of the input single-phase AC voltage. As a result, the FFE rectifier 14 may convert the single-phase AC voltage into DC voltage and return the regenerative braking energy back to the single-phase source 42 while minimizing the input current to the FFE rectifier 14 and the DC voltage ripple and currents output by the FFE rectifier 14.

In one embodiment, the controller 28 may employ a control scheme 50 (FIG. 3) to enable the single-phase motor system 40 to return the regenerative braking energy (e.g., $I_{dc}$) back to the single-phase source 42 while minimizing the input current to the FFE rectifier 14 and the DC voltage and current ripple output by the FFE rectifier 14. The control scheme 50 may send a line voltage signal 52 ($V_{ac}$) that corresponds to the AC voltage supplied by the single-phase source 42 to a gain filter 54. The gain filter 54 may enhance or amplify the line voltage signal 52 for further analysis. For instance, the enhanced line voltage signal may be provided to a single-phase phase-locked loop (PLL) controller 56, which may estimate a phase angle of the enhanced line voltage signal.

Figure 3:
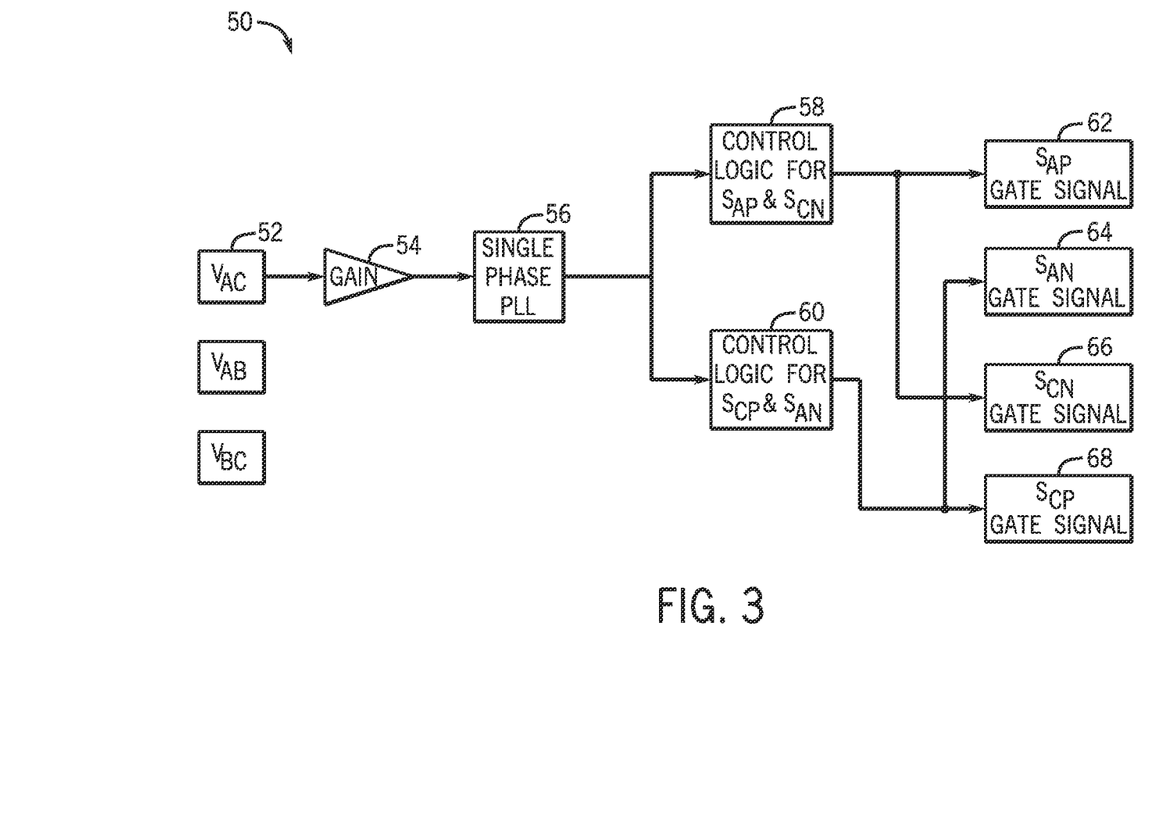
FIG. 3 is a diagrammatical representation of a control scheme for the equivalent circuit of the single-phase motor drive system of FIG. 2, in accordance with an embodiment.

After estimating the phase angle of the enhanced line voltage signal, the control scheme 50 may send the enhanced line voltage signal along with the estimated phase angle of the enhanced line voltage signal to control logic modules (58 and 60) to determine switching pattern signals for the IGBTs 26. As mentioned above, to keep the motor 18 operating while using a single-phase source 42, the controller 28 may send switching pattern signals to the IGBTs 26 located on just two of the three legs of the FFE rectifier 14. Keeping this in mind, the control logic modules (58 and 60) may determine the switching pattern signals for the IGBTs 26 such that the input AC currents provided to the FFE rectifier 14, the DC voltage ripple output by the FFE rectifier 14, and the DC current ripple output by the FFE rectifier may be minimized, the regenerative braking energy (e.g., $I_{dc}$) may be returned back to the single-phase source 42, and the motor 18 may still be operating while connected to the single-phase source 42.

Figure 4:
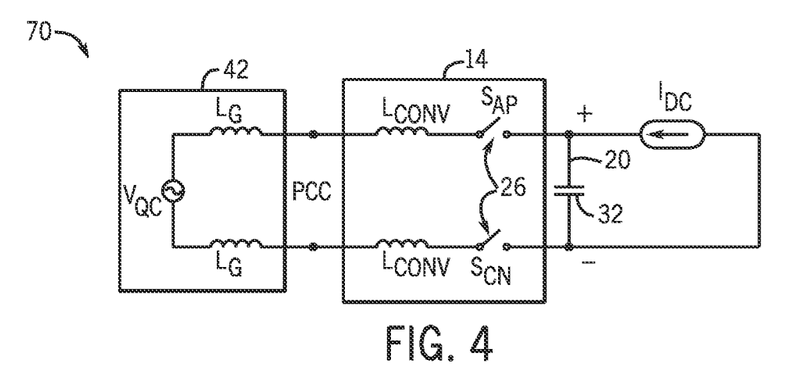
FIG. 4 is a diagrammatical representation of an equivalent circuit of the single-phase motor drive system of FIG. 2 while in operation, in accordance with an embodiment.

To better understand how the control logic modules (58 and 60) may determine the switching pattern signals for the IGBTs 26, FIG. 4 illustrates an equivalent circuit 70 of the single-phase motor drive system 40 when two IGBTs 26 on two different legs of the FFE rectifier 14 are "on" or conducting such that the regenerative braking energy (e.g., $I_{dc}$) may be returned back to the single-phase source 42. As shown in FIG. 4, the equivalent circuit 70 illustrates when an IGBT ($S_{ap}$) on the positive side of a first leg of the FFE rectifier 14 and an IGBT ($S_{cn}$) on the negative side of a second leg of the FFE rectifier 14 are closed such that the regenerative braking energy (e.g., $I_{dc}$) may be returned back to the single-phase source 42. The voltage across the capacitor 32 in the equivalent circuit 70 may be characterized according to the following equation:

$$\frac{\partial^2 V_c}{\partial t^2} = \frac{(V_c - V_{ll}\sin(\omega t + \delta))}{(-2LC)} \quad V_c(0) = V_{dc}, \frac{\partial V_c}{\partial t}(0) = I_{dc}/C \quad (1)$$

where $V_c$ is the voltage of the capacitor 32, C is the capacitance of the capacitor 32, L is the total inductance of the equivalent circuit 70, $V_{ll}$ is the line-to-line voltage of the single-phase source 42 (e.g. $V_{ac}$), ω is the angular frequency of the line-to-line voltage, and t is time.

Based on Equation (1), the current from the capacitor 32 may be defined as:

$$I_c = C\frac{\partial V_c}{\partial t} \quad (2)$$

where Ic is the current from the capacitor 32.

Using the above information, the current conducting through the inductor (L) may be determined according to:

$$I_{ind} = I_{dc} - I_c = -\left(I_{dc}L + 2\sqrt{2CL}\sin\left(\frac{t}{\sqrt{2CL}}\right)\left(\frac{V_{dc}}{4} - \frac{V_{ll}\sin(\delta)}{4}\right) - \right. \quad (3)$$

$$I_{dc}L\cos\left(\frac{t}{\sqrt{2CL}}\right) - 2CI_{dc}L^2\omega^2 - CLV_{ll}\omega\cos(\delta + \omega t) +$$

$$2CI_{dc}L^2\omega^2\cos\left(\frac{t}{\sqrt{2CL}}\right) - \sqrt{2CL}\,CLV_{dc}\omega^2\sin\left(\frac{t}{\sqrt{2CL}}\right) +$$

$$\left. CLV_{ll}\omega\cos\left(\frac{t}{\sqrt{2CL}}\right)\cos(\delta)\right)\Big/(L(2CL\omega^2 - 1))$$

where $I_{dc}$ is the DC current returning to the single-phase source 42, $V_{dc}$ is the DC voltage across the DC bus 20, and δ is the angle at which an IGBT 26 turns on.

Figure 5:
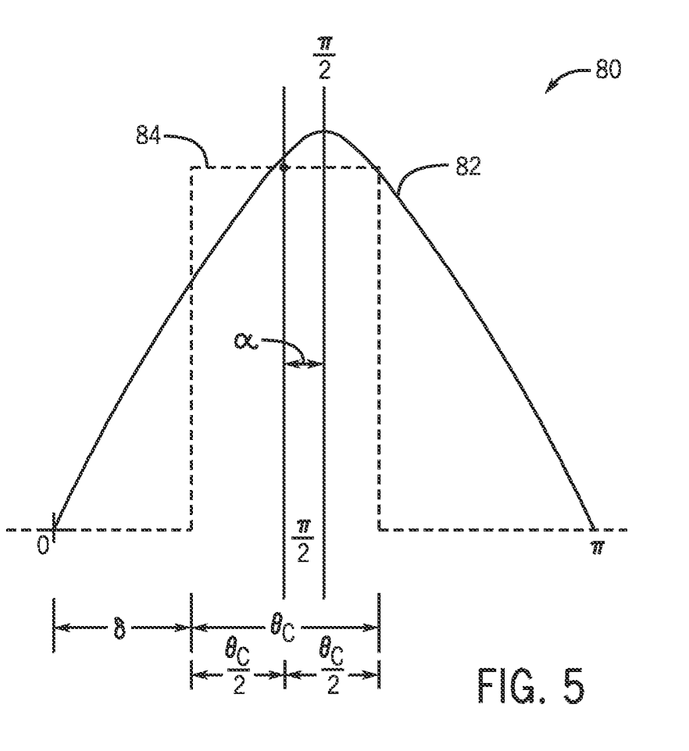
FIG. 5 is a graphical representation of a gate pulse and a firing angle for controlling a switch in the equivalent circuit of the single-phase motor drive system of FIG. 4, in accordance with an embodiment.

The relationship between the angle at which the IGBT 26 conducts (δ), a gate pulse applied to the switch 22, and the line-to-line voltage ($V_{ac}$) is shown in graph 80 of FIG. 5. Graph 80 includes a voltage trace 82 that corresponds to the line voltage 52 of FIG. 3 (i.e., $V_{ac}$) and a gate pulse trace 84 that corresponds to a switching pattern signal (i.e., gate pulse) sent to one of the IGBTs 26. The gate pulse may be controlled by two main parameters: a firing angle α and a conduction angle $θ_c$. The firing angle α may be an angle between a center of the gate pulse (gate pulse trace 84) and a center of a half sine wave (i.e., π/2) that corresponds to half of the voltage trace 82. The conduction angle $θ_c$ represents a width of the gate pulse trace 84. Accordingly, the angle δ at which one of the IGBTs 26 conduct with respect to a zero crossing of the voltage trace 82 may be defined as:

$$\delta = \frac{(\pi - \theta_c)}{2} - \alpha \quad (4)$$

Keeping the foregoing in mind, the average inductor current during a conduction period that corresponds to when an IGBT 26 conducts can be expressed as follows:

$$I_{ind\,avg} = \frac{\omega}{\theta_c}\int_0^{\theta_c/\omega} I_{ind}\partial t \quad (5)$$

$$I_{ind\_average} =$$

$$(\omega\left(I_{dc}\frac{\theta_c}{\omega} + \frac{CV_{ll}(\sin(\delta + \theta_c) - \sin(\delta))}{2CL\omega^2 - 1} - \frac{4C^2LV_{dc}\omega^2\sin\left(\theta\frac{\sqrt{2CL}}{4CL\omega}\right)^2}{2CL\omega^2 - 1} + \right.$$

$$\frac{2CLV_{dc}\sin\left(\theta\frac{\sqrt{2CL}}{4CL\omega}\right)^2}{L(2CL\omega^2 - 1)} + \frac{2CI_{dc}L\sin\left(\theta\frac{\sqrt{2CL}}{2CL\omega}\right)}{(2CL\omega^2 - 1)\sqrt{2CL}} -$$

-continued $$\frac{4C^2 I_{dc} L^2 \omega^2 \sin\left(\theta \frac{\sqrt{2CL}}{2CL\omega}\right)}{(2CL\omega^2-1)\sqrt{2CL}} -$$

$$\frac{2CLV_{ll}\sin\left(\theta \frac{\sqrt{2CL}}{4CL\omega}\right)^2 \sin(\delta)}{L(2CL\omega^2-1)} +$$

$$\left.\frac{2C^2 LV_{ll}\omega\sin\left(\theta \frac{\sqrt{2CL}}{2CL\omega}\right)\left(2\sin\left(\frac{\delta}{2}\right)^2-1\right)}{(2CL\omega^2-1)\sqrt{2CL}}\right)\right)/\theta_c$$

By substituting Equation (4) (i.e., $$\delta = \frac{(\pi-\theta_c)}{2} - \alpha\right)$$

for δ in Equation (5), the resulting equation may be as follows:

$$I_{ind\_average} = (\omega\left(I_{dc}\frac{\theta_c}{\omega} + \frac{CV_{ll}\left(\sin\left(\frac{(\pi+\theta_c)}{2}-\alpha\right)-\sin\left(\frac{(\pi-\theta_c)}{2}-\alpha\right)\right)}{2CL\omega^2-1} - \right.$$ (6)

$$\frac{4C^2 LV_{dc}\omega^2 \sin\left(\frac{\theta_c}{2\omega\sqrt{2CL}}\right)^2}{2CL\omega^2-1} +$$

$$\frac{2CV_{dc}\sin\left(\frac{\theta_c}{2\omega\sqrt{2CL}}\right)^2}{(2CL\omega^2-1)} + \frac{I_{dc}\sqrt{2CL}\sin\left(\frac{\theta_c}{\omega\sqrt{2CL}}\right)}{(2CL\omega^2-1)} -$$

$$\frac{I_{dc}2CL\sqrt{2CL}\,\omega^2 \sin\left(\frac{\theta_c}{\omega\sqrt{2CL}}\right)}{(2CL\omega^2-1)} -$$

$$\frac{2CV_{ll}\sin\left(\frac{\theta_c}{2\omega\sqrt{2CL}}\right)^2 \sin\left(\frac{(\pi-\theta_c)}{2}-\alpha\right)}{(2CL\omega^2-1)} +$$

$$\left.\frac{C\sqrt{2CL}\,V_{ll}\omega\sin\left(\frac{\theta_c}{\omega\sqrt{2CL}}\right)\left(2\sin\left(\frac{\left(\frac{(\pi-\theta_c)}{2}-\alpha\right)}{2}\right)^2-1\right)}{(2CL\omega^2-1)}\right)/\theta_c$$

Equation (6) may then be rewritten as follows:

$$I_{ind\_average} =$$ (7)

$$(\omega\left(I_{dc}\frac{\theta_c}{\omega} + \frac{CV_{ll}\sin(\alpha)-\sin\left(\frac{\theta_c}{2}\right)}{2CL\omega^2-1} - \frac{4C^2 LV_{dc}\omega^2 \sin\left(\frac{\theta_c}{2\omega\sqrt{2CL}}\right)^2}{2CL\omega^2-1} + \right.$$

$$\frac{2CV_{dc}\sin\left(\frac{\theta_c}{2\omega\sqrt{2CL}}\right)^2}{(2CL\omega^2-1)} + \frac{I_{dc}\sqrt{2CL}\sin\left(\frac{\theta_c}{\omega\sqrt{2CL}}\right)}{(2CL\omega^2-1)} -$$

-continued $$\frac{I_{dc}2CL\omega^2\sqrt{2CL}\sin\left(\frac{\theta_c}{\omega\sqrt{2CL}}\right)}{(2CL\omega^2-1)} -$$

$$\frac{2CV_{ll}\sin\left(\frac{\theta_c}{2\omega\sqrt{2CL}}\right)^2 \cos\left(\frac{\theta_c}{2}+\alpha\right)}{(2CL\omega^2-1)} +$$

$$\left.\frac{C\sqrt{2CL}\,V_{ll}\omega\sin\left(\frac{\theta_c}{\omega\sqrt{2CL}}\right)\left(2\sin\left(\frac{\left(\frac{(\pi-\theta_c)}{2}-\alpha\right)}{2}\right)^2-1\right)}{(2CL\omega^2-1)}\right)/\theta_c$$

Referring back to FIG. 3, the control logic modules (58 and 60) may use Equation (7) to determine switching pattern signals or gate pulses for IGBTs 26 on two of the three legs of the FFE rectifier 14 (e.g., $S_{ap}$, $S_{an}$, $S_{cp}$, $S_{cn}$ gate signals 62, 64, 66, 68). In particular, the control logic modules (58 and 60) may use Equation (7) to determine the conduction angle $\theta_c$ and the firing angle α for each of the IGBTs 26 being used in the FFE rectifier 14 since all of the other variable are known. In certain embodiments, the control logic modules (58 and 60) may optimize the conduction angle $\theta_c$ and the firing angle α for each of the IGBTs 26 being used in the FFE rectifier 14 by sweeping the conduction angle $\theta_c$ from 0 to π at various firing angles α.

If the firing angle α is set to zero, Equation (7) may be revised as:

$$I_{ind\_average} =$$ (8)

$$(\omega\left(I_{dc}\frac{\theta_c}{\omega} - \frac{4C^2 LV_{dc}\omega^2\sin\left(\frac{\theta_c}{2\omega\sqrt{2CL}}\right)^2}{2CL\omega^2-1} + \frac{2CV_{dc}\sin\left(\frac{\theta_c}{2\omega\sqrt{2CL}}\right)^2}{(2CL\omega^2-1)} + \right.$$

$$\frac{I_{dc}\sqrt{2CL}\sin\left(\frac{\theta_c}{\omega\sqrt{2CL}}\right)}{(2CL\omega^2-1)} -$$

$$\frac{I_{dc}2CL\omega^2\sqrt{2CL}\sin\left(\frac{\theta_c}{\omega\sqrt{2CL}}\right)}{(2CL\omega^2-1)} -$$

$$\frac{2CV_{ll}\sin\left(\frac{\theta_c}{2\omega\sqrt{2CL}}\right)^2 \cos\left(\frac{\theta_c}{2}\right)}{(2CL\omega^2-1)} +$$

$$\left.\frac{C\sqrt{2CL}\,V_{ll}\omega\sin\left(\frac{\theta_c}{\omega\sqrt{2CL}}\right)\left(2\sin\left(\frac{\left(\frac{(\pi-\theta_c)}{2}\right)}{2}\right)^2-1\right)}{(2CL\omega^2-1)}\right)/\theta_c$$

As such, the control logic modules (58 and 60) may solve Equation (7) or Equation (8) using various conduction angle $\theta_c$ values and various inductance (L) values to determine which conduction angle $\theta_c$ and inductance (L) value pair may be used to minimize the input current (i.e., RMS current) provided to the FFE rectifier 14 and the DC bus ripple (i.e., voltage and current) output by the FFE rectifier 14 while keeping the motor 18 operating using the single-phase source 42. In certain embodiments, the control logic modules (58 and 60) may minimize the input RMS current and the DC bus ripple such that the input RMS current and the peak DC current do not exceed some levels. These levels may be determined based on various factors including limiting an overall stress on the single-phase motor drive system 40 (e.g., trip protective devices), preventing the motor 18 from stopping its operation, and the like.

Generally, when optimizing the conduction angle $\theta_c$ and the firing angle $\alpha$ values, the control logic modules (58 and 60) may determine that the conduction angle $\theta_c$ value for each IGBT 26 of the single-phase motor drive system 40 may be lower than a corresponding conduction angle $\theta_c$ value for each IGBT 26 of the three-phase motor drive system 10. As such, the single-phase motor drive system 40 may be a derated version of the three-phase motor drive system 10. That is, the motor 18 in the single-phase motor drive system 40 may output less power as compared to the motor 18 in the three-phase motor drive system 10. Although the motor 18 in the single-phase motor drive system 40 may output less power as compared to the motor 18 in the three-phase motor drive system 10, by optimizing the conduction angle $\theta_c$ and the firing angle $\alpha$ values for each IGBT 26, the control logic modules (58 and 60) may minimize the input RMS current and the DC bus ripple while keeping the motor 18 in the single-phase motor drive system 40 operating using the single-phase source 42. As a result, the output power of the system 40 using the single-phase source 42 can be maximized and any load connected to the motor 18 may continue to remain online with a proper de-rating and receive power when a three-phase voltage source loses one or two phases or when just one phase of voltage is available.

After determining the optimized conduction angle $\theta_c$ and firing angle $\alpha$ values (i.e., switching pattern signals), the control logic modules (58 and 60) may send the switching pattern signals to the appropriate switches. Referring back to FIG. 2, the optimized conduction angle $\theta_c$ values may cause switches $S_{ap}$ and $S_{cn}$ to turn on simultaneously at the positive peak of the line voltage ($V_{ac}$) and switches $S_{ap}$ and $S_{cn}$ to turn on simultaneously at the negative peak of the line voltage ($V_{ac}$). Since the control logic modules (58 and 60) determine the switching pattern signals for switches located on just two of the three legs of the FFE rectifier 14, the control logic modules (58 and 60) may not send any switching pattern signals to switches located on the third leg (i.e., $S_{bp}$ and $S_{bn}$) such that those switches are continuously off and therefore not conducting.

In one embodiment, since Equations (7) and (8) are non linear equations that may use a significant amount of computing power to solve in real time, the controller 28 may calculate the optimized conduction angle $\eta_c$ and firing angle $\alpha$ values offline and store the results in a lookup table. As such, the controller 28 may retrieve the optimized conduction angle $\theta_c$ and firing angle $\alpha$ values quickly for a variety of system parameters (e.g., protective device trip settings, inductance values). Keeping this in mind, FIG. 6 depicts a flow chart of a method 90 for operating the FFE rectifier 14 of the single-phase motor drive system 10 using the optimized conduction angle $\theta_c$ and firing angle $\alpha$ values.

Figure 6:
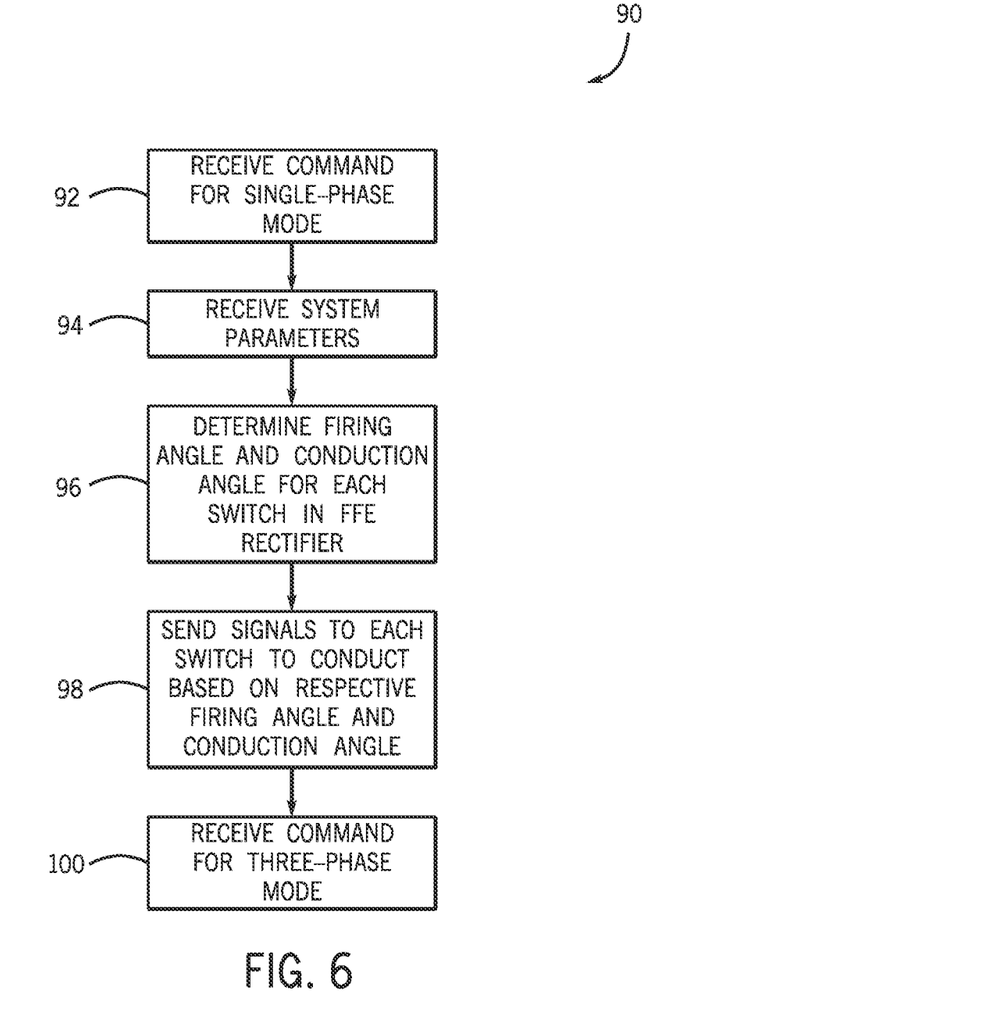
FIG. 6 is a flow chart of a method for operating a fundamental front end (FFE) rectifier of the single-phase motor drive system of FIG. 2, in accordance with an operation.

Referring now to FIG. 6, at block 92, the controller 28 may receive a command to operate the three-phase motor drive system 10 in a single-phase mode. The controller 28 may receive this command in response to receiving an indication that a severe disturbance (e.g., harmonic distortion, unbalanced source current) is present on one or two of the three phases output by the three-phase source 12. Alternatively, the controller 28 may receive this command in response to an indication that a fault (e.g., line-to-line fault, line-to-ground fault) is present on one or two of the three phases output by the three-phase source 12. Otherwise, the controller 28 may receive this command as manual input from a user when just a single-phase source is available.

In any case, after receiving the command to operate the three-phase motor drive system 10 in the single-phase AC input voltage mode, the controller 28, at block 94, may receive parameters related to the three-phase motor drive system 10 (i.e., system parameters). The system parameters may include various characteristics relating to the three-phase motor drive system 10 such as inductance (L) values, a capacitor value for the capacitor 32, a nominal DC voltage rating for the FFE rectifier 14, an operating voltage range of the motor 18, and the like. Additionally, the system parameters may include trip settings for various protective devices such as switchgear in the three-phase motor drive system 10. In some cases, the trip settings may be based on the input AC current provided to the FFE rectifier 14, the DC voltage ripple output by the FFE rectifier 14, and the DC current ripple output by the FFE rectifier 14. In one embodiment, the system parameters may be received from various sensors (e.g., current sensors, voltage sensors, switchgear) disposed at various locations on the three-phase motor drive system 10.

At block 96, the controller 28 may determine a firing angle $\alpha$ and conduction angle $\theta_c$ for each IGBT 26 in the FFE rectifier 14 such that the three-phase motor drive system 10 may operate using a single-phase source. In one embodiment, the controller 28 may determine the firing angle a and the conduction angle $\theta_c$ for each IGBT 26 in the FFE rectifier 14 based on the system parameters. That is, the controller 28 may optimize the firing angle $\alpha$ and the conduction angle $\theta_c$ for each IGBT 26 in the FFE rectifier 14 such that the input AC current provided to the FFE rectifier 14, the DC voltage ripple output by the FFE rectifier 14, and the DC current ripple output by the FFE rectifier 14 may be minimized while operating the motor 18 using a single-phase source.

As mentioned above, the controller 28 may optimize the firing angle $\alpha$ and the conduction angle $\theta_c$ for each IGBT 26 in the FFE rectifier 14 using Equation (7) or (8) in real time or using a look-up table determined by solving Equation (7) or (8) offline. In one embodiment, the controller 28 may find an appropriate firing angle $\alpha$ and the conduction angle $\theta_c$ for each IGBT 26 using the inductance (L) value, received as part of the system parameters, as an index to the look-up table. That is, for each possible inductance (L) value of the single-phase motor drive system 40, the look-up table may include firing angles $\alpha$ and the conduction angles $\theta_c$ for switches 22 located on two of the three legs of the FFE rectifier 14 that may be used to enable the motor 18 to operate while connected to the single-phase source 42.

After determining the firing angle $\alpha$ and the conduction angle $\theta_c$ for each IGBT 26 in the FFE rectifier 14, at block 98, the controller 28 may send a signal to each IGBT 26 in two of the three legs of the FFE rectifier 14 that are being used. The signals may be sent the to the IGBTs 26 such that each IGBT 26 conducts current according to a respective firing angle $\alpha$ and respective conduction angle $\theta_c$.

In certain embodiments, after operating the three-phase motor drive system 10 in the single-phase mode, at block 100, the controller 28 may receive a command to return the three-phase motor drive system 10 to operate in the three-phase mode. As such, the controller 28 may resume sending signals to the IGBTs 26 located on all three legs of the FFE rectifier. The command to return the three-phase motor drive system 10 to the three-phase mode may be prompted by a user when the three-phase source 12 becomes available, when a temporary disturbance on one or two of the phases of the three-phase source 12 has passed, when a fault on one or two of the phases of a three-phase source 12 has been removed, or the like. By employing the method 90 described above, the motor 18 of the three-phase motor drive system 10 may continuously operate so long as at least one phase of AC voltage is available to input to the FFE rectifier 14.

While only certain features have been illustrated and described herein, many modifications and changes will occur to those skilled in the art. It is, therefore, to be understood that the appended claims are intended to cover all such modifications and changes.

The invention claimed is:

1. A drive system, comprising:
  a rectifier configured to couple to a three-phase alternating current (AC) voltage source, wherein the rectifier is configured to convert AC voltage from the three-phase AC voltage source to a direct current (DC) voltage; and
  a controller configured to:
    operate the rectifier using a single phase of the three-phase AC voltage source, wherein operating the rectifier using the single phase of the three-phase voltage source comprises sending a plurality of switching signals to a plurality of switches in the rectifier via a plurality of wired or wireless communication links, and wherein the plurality of switching signals are configured to minimize a current provided to the rectifier from the single phase of the three-phase AC voltage source while maintaining an operation of a motor coupled to the drive system, wherein the controller is configured to send the plurality of switching signals by:
      determining a plurality of firing angles for the plurality of switches;
      determining a plurality of conduction angles for the plurality of switches, wherein the plurality of firing angles and the plurality of conduction angles are configured to minimize the current provided to the rectifier; and
      sending the plurality of firing angles and the plurality of conduction angles to the plurality of switches.

2. The drive system of claim 1, comprising an inverter configured to couple to the rectifier and configured to invert the DC voltage into a three-phase AC voltage.

3. The drive system of claim 2, comprising the motor configured to couple to the inverter, wherein the motor is configured to drive a load using the three-phase AC voltage.

4. The drive system of claim 1, wherein the rectifier is a fundamental front end (FFE) rectifier.

5. The drive system of claim 4, wherein the FFE rectifier is configured to return regenerative braking energy from the motor to the three-phase AC voltage source.

6. The drive system of claim 1, wherein the plurality of switches comprise a plurality of insulated gate bipolar transistors (IGBTs).

7. The drive system of claim 1, wherein the plurality of switches correspond to switches disposed on two of three legs of the rectifier.

8. The drive system of claim 1, wherein the plurality of firing angles and the plurality of conduction angles are configured to keep the motor in the drive system operating when only the single phase of the three-phase AC voltage source is available.

9. The drive system of claim 1, wherein the controller is configured to determine the plurality of firing angles and the plurality of conduction angles based on:

$$I_{ind\_average} = \left( \omega \left( I_{dc} \frac{\theta_c}{\omega} + \frac{CV_{ll}\sin(\alpha) - \sin\left(\frac{\theta_c}{2}\right)}{2CL\omega^2 - 1} - \frac{4C^2 LV_{dc}\omega^2 \sin\left(\frac{\theta_c}{2\omega\sqrt{2CL}}\right)^2}{2CL\omega^2 - 1} + \frac{2CV_{dc}\sin\left(\frac{\theta_c}{2\omega\sqrt{2CL}}\right)^2}{(2CL\omega^2 - 1)} + \frac{I_{dc}\sqrt{2CL}\sin\left(\frac{\theta_c}{\omega\sqrt{2CL}}\right)}{(2CL\omega^2 - 1)} - \frac{I_{dc} 2CL\omega^2 \sqrt{2CL} \sin\left(\frac{\theta_c}{\omega\sqrt{2CL}}\right)}{(2CL\omega^2 - 1)} + \frac{2CV_{ll}\sin\left(\frac{\theta_c}{2\omega\sqrt{2CL}}\right)^2 \cos\left(\frac{\theta_c}{2} + \alpha\right)}{(2CL\omega^2 - 1)} + \frac{C\sqrt{2CL}\, V_{ll}\omega\sin\left(\frac{\theta_c}{\omega\sqrt{2CL}}\right)\left(2\sin\left(\frac{\left(\frac{(\pi - \theta_c)}{2} - \alpha\right)}{2}\right)^2 - 1\right)}{(2CL\omega^2 - 1)} \right) \right) \Big/ \theta_c$$

wherein $I_{ind\_average}$ is the current, $I_{dc}$ is a DC current returning to the rectifier, $V_{dc}$ is a DC voltage across a DC bus coupled to the rectifier, C is a capacitance value of a capacitor coupled across the DC bus, $\omega$ is an angular frequency of a single-phase AC voltage from the three-phase AC voltage source, L is an inductance value that corresponds to the rectifier operating using the single-phase AC voltage from the three-phase AC voltage source, $V_{ll}$ is the single-phase AC voltage, $\alpha$ is a firing angle that corresponds to one of the plurality of switches, and $\theta_c$ is a condution angle that corresponds to the one of the plurality of switches.

10. The drive system of claim 1, wherein the controller is configured to send the plurality of switching signals by:
  receiving one or more system parameters associated with the drive system; and
  generating the plurality of switching signals based at least in part on the system parameters; and
  sending the generated plurality of switching signals to the plurality of switches.

11. The drive system of claim 10, wherein the system parameters comprise an inductance value that corresponds to the rectifier.

12. The drive system of claim 10, wherein the system parameters comprise one or more trip settings that correspond to one or more protective devices in the drive system, an operating voltage range of the motor in the drive system, or any combination thereof.

13. A system, comprising:
  a six-pulse fundamental front end (FFE) rectifier configured to convert a single-phase alternating current (AC) voltage from a single-phase AC source to direct current (DC) power applied to a DC bus; and
  a controller configured to send a plurality of switching signals to a plurality of switches in the six-pulse FFE rectifier via a plurality of wired or wireless communication links, wherein the plurality of switching signals is configured to minimize a root-mean-square current provided to the six-pulse FFE rectifier from the single-phase AC source while keeping a motor in a drive system operating using the single-phase AC source.

14. The system of claim 13, wherein a portion of the plurality of switching signals is configured to close a first switch during a positive peak of the single-phase AC voltage and close a second switch during a negative peak of the single-phase AC voltage, wherein the first switch is disposed on a positive side of the six-pulse FFE rectifier and the second switch is disposed on a negative side of the six-pulse FFE rectifier.

15. The system of claim 14, wherein the first switch is disposed on a first leg of the six-pulse FFE rectifier and the second switch is disposed on a second leg of the six-pulse FFE rectifier.

16. The system of claim 13, wherein the plurality of switching signals is configured to minimize a DC voltage ripple output by the six-pulse FFE rectifier.

17. A method, comprising:
   operating, via at least one processor, a rectifier of a three-phase motor drive system using a single-phase alternating current (AC) voltage, wherein the rectifier is configured to convert the single-phase AC voltage into a direct current (DC) voltage;
   determining, via the at least one processor, a plurality of switching signals for a plurality of switches in the rectifier, wherein the plurality of switching signals is configured to keep a motor in the three-phase motor drive system operating using the single-phase AC voltage, and wherein the plurality of switching signals is configured to minimize a root-mean-square current input into the rectifier, a DC voltage ripple output by the rectifier, a DC current ripple output by the rectifier, or any combination thereof; and
   sending, via the at least one processor, the plurality of switching signals to the plurality of switches using a plurality of communication links between the at least one processor and the plurality of switching signals.

18. The method of claim 17, wherein the rectifier operates using the single-phase AC voltage when one or two of three phases in a three-phase AC voltage source coupled to the rectifier is unavailable.

19. The method of claim 17, wherein the rectifier operates using the single-phase AC voltage when one or two of three phases in a three-phase AC voltage source coupled to the rectifier has a fault.

20. The method of claim 17, comprising operating, via the at least one processor, the rectifier using a three-phase voltage when a three-phase AC voltage source coupled to the rectifier is available.

21. The method of claim 20, wherein operating the rectifier, via the at least one processor, using the three-phase voltage comprises:
   modifying, via the at least one processor, the plurality of switching signals, wherein the modified plurality of switching signals is configured to enable the rectifier to convert the three-phase voltage into the DC voltage; and
   sending, via the at least one processor, the modified plurality of switching signals to the plurality of switches.

22. A method, comprising:
   operating, via at least one processor, a rectifier of a three-phase motor drive system using a single-phase AC voltage of a three-phase alternating current (AC) voltage, wherein the rectifier is configured to convert the three-phase AC voltage into a direct current (DC) voltage, wherein operating the rectifier using the single-phase AC voltage comprises:
      determining, via the at least one processor, a plurality of switching signals for a plurality of switches in the rectifier, wherein the plurality of switching signals is configured to keep a motor in the three-phase motor drive system operating using the single-phase AC voltage; and
      sending, via the at least one processor, the plurality of switching signals to the plurality of switches using a plurality of communication links between the at least one processor and the plurality of switching signals, wherein sending the plurality of switching signals comprises:
         determining a plurality of firing angles for the plurality of switches;
         determining a plurality of conduction angles for the plurality of switches, wherein the plurality of firing angles and the plurality of conduction angles are configured to minimize a current provided to the rectifier while keeping the motor in the three-phase motor drive system operating using the single-phase AC voltage; and
         sending the plurality of firing angles and the plurality of conduction angles to the plurality of switches.

23. The method of claim 22, wherein the motor operates in a reduced power mode.

24. The method of claim 22, comprising operating, via the at least one processor, the rectifier using the three-phase AC voltage when the three-phase voltage becomes available by:
   modifying, via the at least one processor, the plurality of switching signals for the plurality of switches in the rectifier, wherein the modified plurality of switching signals is configured operate the motor in the three-phase motor drive system; and
   sending, via the at least one processor, the modified plurality of switching signals to the plurality of switches using a plurality of communication links between the at least one processor and the plurality of switching signals.

* * * * *